(12) United States Patent
Wada et al.

(10) Patent No.: US 6,220,014 B1
(45) Date of Patent: Apr. 24, 2001

(54) SINGLE SHAFT COMBINED CYCLE PLANT AND OPERATING METHOD THEREOF

(75) Inventors: Norihisa Wada; Haruo Urushidani; Tsuguo Hashimoto, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/644,697

(22) Filed: Aug. 24, 2000

Related U.S. Application Data

(62) Division of application No. 09/194,723, filed as application No. PCT/JP96/01762 on Jun. 26, 1996.

(51) Int. Cl.$^7$ ..................................................... F02C 6/00
(52) U.S. Cl. ....................................... 60/39.02; 60/39.182
(58) Field of Search ............................... 60/39.02, 39.182, 60/39.141

(56) References Cited

U.S. PATENT DOCUMENTS

| Re. 36,497 | * | 1/2000 | Tomlinson | 60/39.02 |
| 4,571,935 | * | 2/1986 | Rice | 60/39.182 X |
| 5,979,156 | * | 11/1999 | Uematsu et al. | 60/39.141 |
| 6,089,012 | * | 7/2000 | Sugishita et al. | 60/39.182 |

FOREIGN PATENT DOCUMENTS 62-101809   5/1987   (JP) .

* cited by examiner

*Primary Examiner*—Ted Kim
(74) *Attorney, Agent, or Firm*—Mattingly, Stanger & Malur

(57) ABSTRACT

In a system configuration and operating method for a single shaft combined cycle plant comprising a gas turbine (10), an exhaust heat recovery boiler (30) for generating steam using exhaust heat discharged from the gas turbine; and a steam turbine (20) driven by steam generated from the exhaust heat recovery boiler (30), rotors of the gas turbine (10) and rotors of the steam turbine (20) being coupled, and the steam turbine comprising a high pressure turbine (21) being supplied with and driven by high pressure steam generated at a superheater of the exhaust heat recovery boiler (30) and a reheating turbine (22) supplied with and driven by steam that passes through the high pressure turbine (21) and is reheated by a reheater of the exhaust heat recovery boiler (30), the gas turbine (10) operates independently, a regulated amount of cooling steam is supplied to the steam turbine (20) in order to prevent superheating due to windage loss of the steam turbine (20) rotating in an unventilated state, a bypass path (75) is provided in parallel with the exhaust heat recovery boiler (30) as a path through which cooling steam flows in order to further raise the cooling effect, and each turbine and a condenser (25) are made to communicate so as to make pressure within the turbines low.

3 Claims, 6 Drawing Sheets

SINGLE SHAFT COMBINED CYCLE PLANT AND OPERATING METHOD THEREOF

This is a divisional application of U.S. Ser. No. 09/194,723, filed Dec. 21, 1998, which is a 371 of PCT/JP96/01762, filed Jun. 26, 1996.

TECHNICAL FIELD

The present invention relates to a combined cycle plant where a gas turbine and a steam turbine are coupled on a single shaft and the steam turbine is a reheating-type steam turbine.

BACKGROUND ART

With reheating-type plants of related single shaft combined cycle plants, in that disclosed in, for example, Japanese Patent Laid-open Publication No. Sho. 62-101809, steam provided to a high-pressure turbine bypasses the high-pressure turbine and is supplied to the reheating turbine. The high-pressure turbine is then made to communicate with a condenser and heating accompanying windage loss of high-pressure turbines and reheating turbines at the time of activation of the steam turbine is prevented.

DISCLOSURE OF INVENTION

There are cases where steam supplied to a high pressure turbine is superheated by a reheater of an exhaust heat recovery boiler and supplied to a reheating turbine due to the influence of activation conditions, etc. When unit capacity is increased in a single shaft combined cycle plant, output of a steam turbine also rises in accompaniment with increases in output of a gas turbine and the influence of accompanying heat generated due to windage loss occurring due to the rotor blades of the steam turbine being long is substantial.

The object of the present invention is to provide a single shaft combined cycle plant and single shaft combined cycle plant activating method capable of suppressing the influence of steam superheated by the exhaust heat recovery boiler at the time of activation of a reheating type single shaft combined cycle plant and capable of providing stability while suppressing the influence of windage loss of the high pressure turbine and the reheating turbine.

In a first characteristic of the present invention, a single shaft combined cycle plant comprises a gas turbine, an exhaust heat recovery boiler for generating steam using exhaust heat discharged from the gas turbine; and a steam turbine driven by steam generated from the exhaust heat recovery boiler, rotors of the gas turbine and rotors of the steam turbine being coupled, and the steam turbine comprising a high pressure turbine being supplied with and driven by high pressure steam Generated at a superheater of the exhaust heat recovery boiler and a reheating turbine supplied with and driven by steam that passes through the high pressure turbine and is reheated by a reheater of the exhaust heat recovery boiler, wherein steam outputted from the high pressure turbine is made to bypass the reheater from a path leading to the reheater of the exhaust heat recovery boiler and is introduced to a path from the reheater leading to the reheating turbine.

As a result, at the time of plant activation the following steps take place.

A first step of activating the gas turbine and causing rotor speed thereof to rise, a second step of supplying gas turbine exhaust gas to the exhaust heat recovery boiler and causing steam to be generated at the exhaust heat recovery boiler, a third step of supplying steam generated at the exhaust heat recovery boiler to the high pressure turbine rotating with the gas turbine and supplying steam that has passed through this high pressure turbine to the reheating turbine via a bypass path connecting a path leading steam outputted from the high pressure turbine to the reheater and a path leading to the reheating turbine from the reheater, a fourth step of supplying steam generated by the superheater to the reheating turbine via the reheater after desired conditions for the steam generated from the exhaust heat recovery boiler are reached and a fifth step of obtaining an output from the steam turbine.

In the present invention, the reheating of steam generated from the exhaust heat recovery boiler before being supplied to the reheating turbine can be suppressed and steam where the superheating due to the windage loss of the reheating turbine has been cooled to an extent can be supplied.

Further, tripping of the turbine due to superheating accompanying the windage loss of the reheating turbine can be suppressed.

In a second characteristic of the present invention:

separately provided steam supplying means supplies steam to the reheating turbine, a steam connecting path connects the third steam path and the first steam path and discharging means discharges steam supplied from the steam supplying means that flows via the reheating turbine and flows through the second steam path to outside of the second steam path.

As a result, at the time of plant activation the following steps take place.

A first step of activating the gas turbine and causing the rotational speed thereof to rise, a second step of supplying gas turbine exhaust gas to the exhaust heat recovery boiler and causing steam to be generated at the exhaust heat recovery boiler, a third step of supplying steam to the high pressure turbine through the reheating turbine and a steam connecting path provided in such a manner as to connect the third steam path and the first steam path; and discharging steam flowing through the second steam path via the high pressure turbine to outside of the second steam path via discharging means provided at the second path, a fourth step of supplying steam venerated by the superheater to the reheating turbine via the reheater after desired conditions for the steam generated from the exhaust heat recovery boiler are reached and a fifth step of obtaining an output from the steam turbine.

Cooling steam that has passed through the reheating turbine is therefore reheated at the exhaust heat recovery boiler and the flow of high temperature steam into low temperature reheating piping downstream of the high pressure turbine, that is designed for conventional temperatures is prevented.

In a third characteristic of the present invention:

first discharging means, arranged upstream of a check valve provided at the second steam path, discharges steam within the high pressure turbine to outside of the high pressure turbine, separately provided steam supplying means supplies steam to the reheating turbine, second discharging means discharges steam, that flows through the third steam path after being supplied from the steam supplying means via the reheating turbine, to outside of the third steam path and the second discharging means is positioned downstream from a reheated steam valve provided at the third path for regulating the amount of steam going to the reheating turbine.

As a result, at the time of plant activation the following steps take place.

A first step of activating the gas turbine and causing the rotational speed thereof to rise, a second step of supplying gas turbine exhaust gas to the exhaust heat recovery boiler and causing steam to be generated at the exhaust heat recovery boiler, a third step of discharging steam remaining within the high pressure turbine using a first discharging means, arranged upstream of a check valve provided at the second steam path, for discharging steam within the high pressure turbine to outside of the high pressure turbine, supplying steam to the reheating turbine and the low pressure turbine using separately provided steam supplying means, and discharging steam passing through the reheating turbine and flowing down the third steam path using a second discharging means, arranged at the third steam path, for discharging steam to outside of the third steam path, a fourth step of supplying steam generated by the superheater to the reheating turbine via the reheater after desired conditions for the steam generated from the exhaust heat recovery boiler are reached and a fifth step of obtaining an output from the steam turbine.

Superheating due to windage loss of the high pressure turbine and reheating turbine and steam reheated by the reheater does not flow as high temperature steam into the low temperature reheating piping downstream of the reheating turbine and high pressure turbine.

The present invention described above can also work in an effective manner in cases where operation is temporarily halted and then restarted again after only a brief cessation or cases where a long period of time is required between the starting up of the gas turbine and the ventilating of and the obtaining of an output from the steam turbine for some reason at the time of start up.

The present invention therefore sets out to pay attention to the fact that, due to conditions at the time of start up etc., steam outputted from the high pressure steam turbine is superheated by the exhaust heat recovery boiler and cannot cool turbines superheated due to windage loss at the time of supplying steam to the reheating turbine, in such a manner that superheating due to windage loss can be suppressed in the high pressure turbine and the reheating turbine by preventing this situation.

The reheating type single shaft combined cycle plant is therefore capable of suppressing the influence of superheating of steam by the exhaust heat recovery boiler due to the influence of the activation conditions etc. and providing stability while suppressing the influence of windage loss of the high pressure turbine and the reheating turbine.

BEST MODE FOR CARRYING OUT THE INVENTION

When independent operation of a gas turbine is possible in a combined cycle plant power installation where a gas turbine and steam turbine are coupled on a single shaft, the steam turbine is made to rotate at a high speed by the operation of gas turbine. The rotor blades of the steam turbine are then heated up by so-called windage loss due to frictional heating with steam staying within the turbine as a result of the inflow of gland sealing steam and when this amount of heating due to this windage loss builds up, overheating of the turbine at high temperatures can be suppressed.

In order to prevent these temperature rises in a related single shaft combined cycle plant, accumulation of heat is avoided and temperature rises within the steam turbine are prevented by only supplying cooling steam to an intermediate and low pressure turbine where temperature may rise due to windage loss with long rotor blades and having an amount of heat generated by windage loss flow away at a following stage. This is described below.

The present invention is by no means limited to the embodiments described below.

Figure 1:
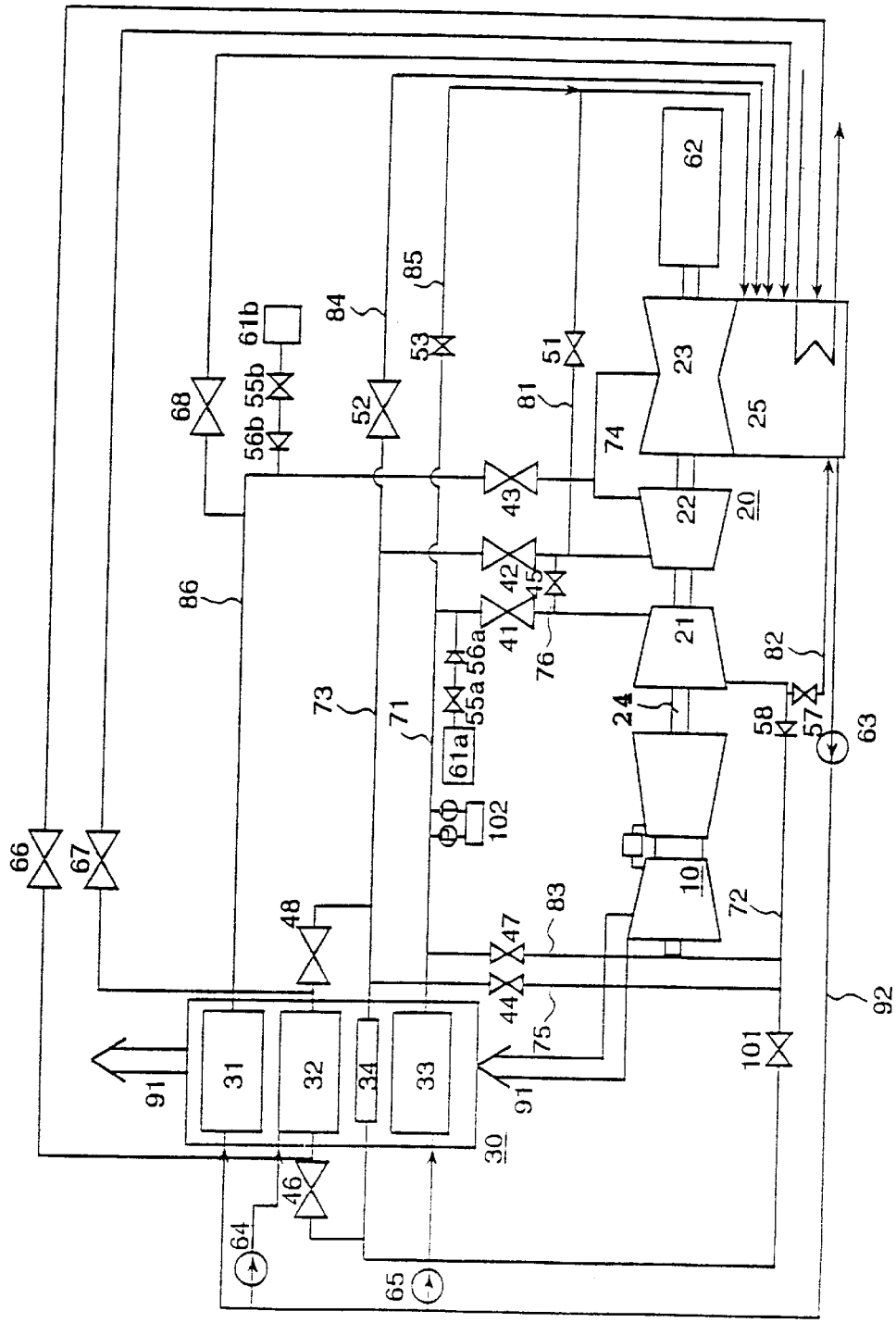
FIG. 1 is a structural view of the outline of the single shaft combined cycle plant of the present invention.

FIG. 1 is a structural view of the outline of a reheating-type single shaft combined cycle power installation of the present invention.

An outline of common portions of the present invention is described in the following Numeral 10 indicates a gas turbine, numeral 20 indicates a steam turbine, numeral 21 indicates a high pressure turbine, numeral 22 indicates a reheating type turbine, numeral 23 indicates a low pressure turbine, numeral 25 indicates a condenser and numeral 62 indicates a generator. Further, at an exhaust heat recovery boiler 30 taking exhaust gas 91 of the gas turbine 10 as a heat source, numeral 31 indicates a low pressure drum, numeral 32 indicates an intermediate pressure drum, numeral 33 indicates a high pressure drum and numeral 34 indicates a reheater. A rotor 64 communicates with the gas turbine 10 and the steam turbine 20.

Numeral 71 represents a high pressure steam pipe for connecting the high pressure drum 33 and the high pressure turbine 21. Numeral 41 represents a high pressure steam valve for controlling the amount of steam generated at the high pressure drum 33 that is supplied to the high pressure turbine 21. Numeral 72 represents a low temperature reheating steam pipe for connecting the high pressure turbine 21 and the reheater 34. Numeral 73 represents a high temperature reheating steam pipe for connecting the reheater 34 and the reheating type turbine 22. Numeral 42 is a reheated steam valve for controlling the amount of steam reheated by the reheater 34 that is supplied to the reheating type turbine 22.

Numeral 74 represents a crossover pipe for connecting an outlet of the reheating type turbine 22 and an inlet of the low pressure turbine 23. Numeral 83 represents a high pressure turbine bypass pipe and numeral 47 represents a high pressure turbine bypass valve. Numeral 84 represents a reheating turbine bypass pipe and numeral 52 represents a reheating turbine bypass valve. Numeral 85 represents a high pressure turbine piping system, numeral 53 represents a high pressure regulation valve, numeral 86 represents a low pressure steam pipe and numeral 43 represents a low pressure steam valve for controlling the amount of low pressure steam generated at the low pressure drum 31 that is supplied to the low pressure turbine 23. Numeral 46 represents an intermediate pressure steam valve for controlling the amount of steam of intermediate pressure generated at the intermediate pressure drum 32 that is supplied to the reheating type turbine 22. Numeral 92 represents a water supply pipe for steam condensed by the condenser, numeral 63 represents a low pressure water supply pump, numeral 64 represents an intermediate pressure water supply pump and numeral 65 represents a high pressure water supply pump. Supplied water that has been raised in pressure at the low pressure water supply pump 63 is raised to a high pressure so as to correspond to the intermediate pressure drum 32 and the high pressure drum 33.

Signal lines and control means etc. are omitted.

The present invention prevents overheating of a reheating type single shaft combined cycle plant where a steam piping system connecting a high pressure turbine and a reheating turbine is divided using valves.

During normal operation of the plant, exhaust gas 91 from the gas turbine 10 is supplied to the exhaust heat recovery boiler 30. The exhaust heat recovery boiler 30 performs heat exchanging using a plurality of heat exchangers taking the exhaust gas 91 as a heat source so that high pressure steam, intermediate pressure steam and low pressure steam is Generated.

High pressure steam generated by the high pressure drum 33 passes through the high pressure steam pipe 71 and is supplied to the high pressure turbine 21 via the high pressure steam valve 41. Steam is therefore supplied at a temperature of approximately 538° C. at a flow rate of approximately 180 t/h at a pressure of approximately 100 ata. Low temperature reheated steam flowing in the low temperature reheating steam pipe 72 after the high pressure turbine 21 has done its job becomes high temperature regenerated steam regenerated at the reheater 34. The high temperature regenerated steam flows through the high temperature reheating steam pipe 73 and is supplied to the reheating type turbine 22 via the reheated steam valve 42. For example, steam is supplied at a pressure of 25 ata at approximately the same temperature as the steam supplied to the high pressure turbine.

Steam passing through the reheating type turbine 22 passes through the crossover pipe 74 and is supplied to the low pressure turbine 23. For example, steam is supplied at a temperature lower than that of supplying to the reheating turbine at a pressure of approximately 4 ata. Steam passing through the low pressure turbine 23 is then condensed at the condenser 25. This is again supplied to the exhaust heat recovery boiler 30 using the low pressure water supply pump 63 via the water supply pipe 92 and is reutilized as a steam source. As an example, the condenser attains a steam pressure of approximately 0.05 ata using a vacuum pump.

Further, electricity is generated by the generator 62 connected to the intermediate pressure water supply pump 64 as a result of rotations of the rotor 64 to which the gas turbine 10 and the steam turbine 20 are coupled.

Intermediate steam generated from the intermediate pressure drum 32 can then be mixed at the low temperature reheating steam pipe 72 via the intermediate pressure steam valve 46 shown in the drawings or mixed at the high temperature reheating steam pipe 73 via a further intermediate steam valve 48. Further, the low pressure steam of the low pressure drum 31 is supplied to the crossover pipe 74 via the low pressure steam valve 43 and the amount of steam going to the low pressure turbine 23 can be increased. A flow of, for example, approximately 25 t/h can be achieved, although this differs depending on the scale of the plant. The intermediate pressure steam and the low pressure steam can then be individually regulated to the desired steam conditions using an intermediate pressure steam regulating valve 66 (or 67) and a low pressure steam regulating valve 68.

Next, an outline at the time of start up is shown in the following with reference to FIG. 1 and FIG. 2.

The single shaft combined cycle plant of the present invention first ignites the gas turbine 10 and sequentially raises the rotational speed. When the rated rotational speed is approached, outputting from the gas turbine 10 is commenced.

If the exhaust heat recovery boiler 30) reaches prescribed steam conditions due to the exhaust gas 91 of the gas turbine, the steam turbine 20 is completely ventilated and the steam turbine 20 starts up.

The high pressure steam valve 41, intermediate pressure steam valve 46 (or 48), the low pressure steam valve 43 and the reheated steam valve 42, for example, are closed until the ventilation to the steam turbine 20 from activation of the gas turbine 10 commences.

For example, the steam generated at the high pressure drum 33 is supplied to the condenser via the high pressure regulation valve 53 and the high pressure turbine piping system 85 so that raising of the steam conditions can be awaited.

Further, when a high pressure turbine bypass system is installed, improvement of the steam conditions can also be awaited by opening the high pressure turbine bypass valve 47, allowing steam to flow through the low temperature reheating steam pipe 72 via the high pressure turbine bypass pipe 83 and opening the reheating turbine bypass valve 52 so that steam flows from the high temperature reheating steam pipe 73 to the condenser via the reheating turbine bypass pipe 84.

In order to obtain the output from the steam turbine 20, the high pressure regulation valve 53 is closed and the high pressure steam valve 41 is opened so that steam generated by the exhaust heat recovery boiler 30 is supplied to the high pressure turbine 21.

Alternatively, for example, during a time period in which a rated output of a few to 20 percent is attained after ventilation, the reheated steam valve 42 is opened and the high pressure regulation valve 53 is closed so that steam generated from the exhaust heat recovery boiler 30 is supplied to the reheating type turbine 22 and the low pressure turbine 23 via the high pressure turbine bypass valve 47. The amount supplied to the steam turbine 20 is then gradually increased from the start of ventilation.

While the rated output is set to approximately a few to twenty percent or more, the high pressure steam valve 41 is opened and the high pressure turbine bypass valve 47 is closed. Steam generated from the exhaust heat recovery boiler 30 can then be supplied to the high pressure turbine 21.

Figure 3:
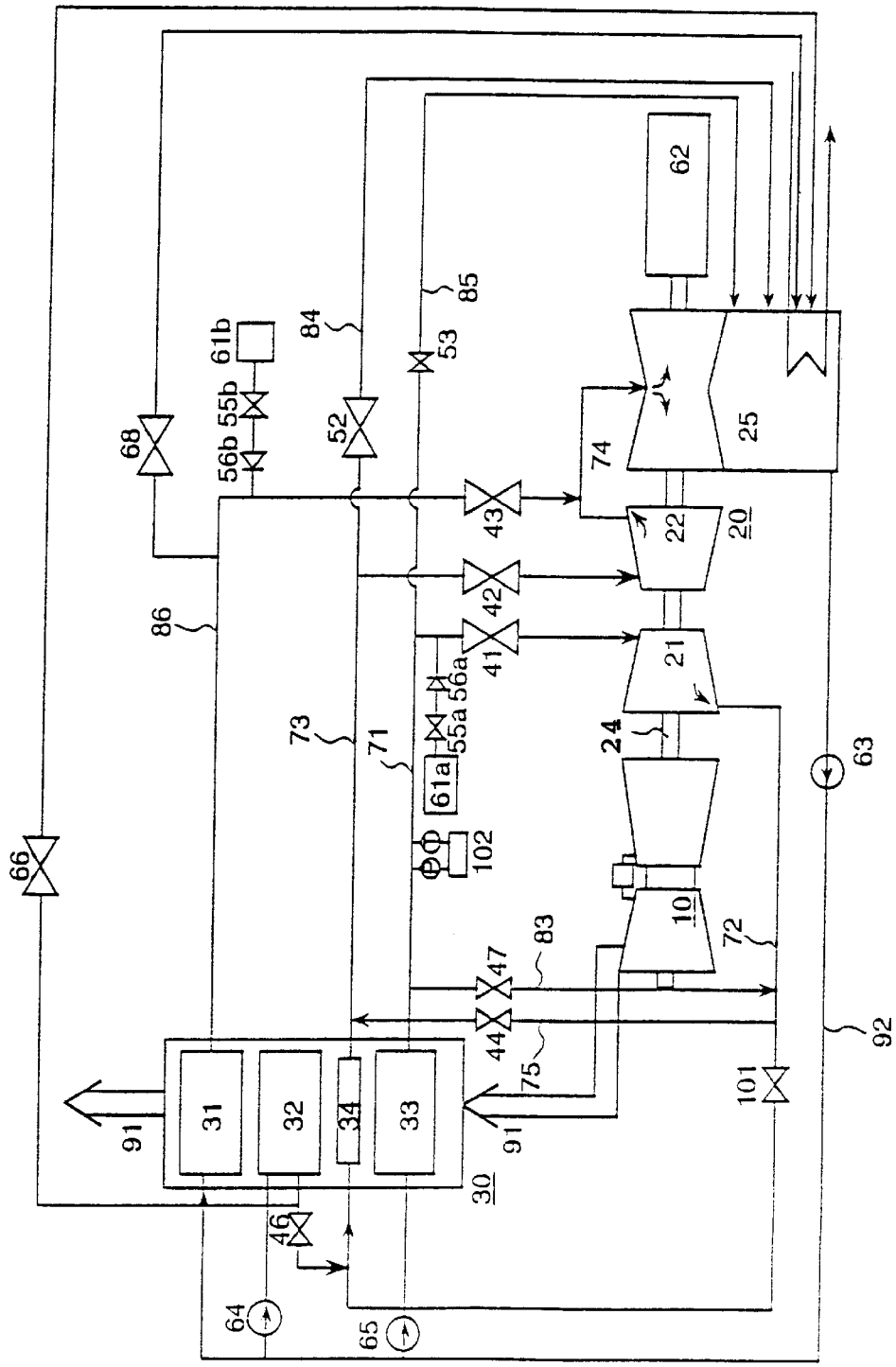
FIG. 3 is an outline illustration of a first embodiment of the present invention.

A first embodiment of the present invention will now be described using the outline configuration view of FIG. 1 and the outline illustration of the embodiment of FIG. 3.

In addition to the common aspects of the configurations, there are provided a bypass path 75 communicating with the low temperature reheating steam pipe 72 and the high temperature reheating steam pipe 73 arranged in parallel with the exhaust heat recovery boiler, a bypass valve 44 for controlling whether steam that passes through the high pressure turbine 21 flows through the reheater 34 of the exhaust heat recovery boiler 30 or the bypass path 75 and a low temperature reheated steam valve 101.

Cooling steam is supplied to the high pressure turbine 21 and the reheating type turbine 22 during the period from starting up of the gas turbine until ventilation of the steam turbine so that heating up due to the windage loss of these turbines is prevented.

When the high pressure steam valve 41, reheated steam valve 42 and the bypass valve 44 are open and the high pressure turbine bypass valve 47 and reheating turbine bypass valve 52 are present, these are closed together with the low temperature reheated steam valve 101. Switching over etc. of the bypass valve 44 and the low temperature reheated steam valve 101 is carried out by a control device (not shown).

Some of the high pressure steam generated by the high pressure drum 33 of the exhaust heat recovery boiler 30 is supplied to the high pressure turbine 21 for carrying out cooling. The temperature of the provided steam is decided by the conditions such as the steam turbine metal temperature etc. but cooling steam of a temperature of 250° C. or more can be provided at approximately 2 t/h.

The high pressure steam valve 41 is opened co a prescribed extent so that the amount of cooling steam required can flow. Steam generated at the high pressure drum 33 but not supplied as cooling steam can then be supplied, for example, from the high pressure steam pipe 71 to the condenser via the high pressure turbine piping system 85 equipped with the high pressure regulation valve 53 that is opened to a prescribed extent, as necessary.

Steam that passes through the high pressure steam turbine then flows through the low temperature reheating steam pipe 72, flows through the bypass path 75 in such a manner as to bypass the high pressure drum 33 of the exhaust heat recovery boiler 30 and enters the high temperature reheating steam pipe 73. This steam then flows through the reheated steam valve 42 that is open to a prescribed extent and is supplied to the reheating type turbine 22. After this, the steam passes through the crossover pipe 74 and is supplied to the condenser 25 via the low pressure turbine 23.

As a result of this, the amount of heat generated by windage loss of the rotor blades at each stage by the high pressure turbine 21 and the reheating type turbine 22 flows away at the following stages, accumulation of heat is avoided and cooling of each turbine can be carried out. Steam passing through the high pressure turbine can then be made to bypass the exhaust heat recovery boiler 30 so as to not be reheated, and sufficient prevention of windage loss of the reheating turbine can be exhibited because steam is supplied to the reheating type turbine 22. If the amount of heating up due to the reheater 34 is not detrimental to the cooling effect, a cooling effect can be obtained even with the same configuration as where the bypass valve 44 is closed, the low temperature reheated steam valve 101 is opened and the bypass path 75 is not provided. When the temperature of the exhaust heat recovery boiler 30 does not rise so much at the time of activation, the temperature of the boiler can be raised more quickly because the heat is not removed at the reheater 34.

When the amount of steam generated by the exhaust heat recovery boiler 30) is small and the cooling effect is not sufficient during the supplying of cooling steam, a supplementary steam supplying device 61*a,* regulating valve 55*a* and check valve 56*a* are arranged prior to and after the high pressure steam valve 41 of the high pressure steam pipe 71. As a result, part or all of the steam supplied to the high pressure turbine 21 is obtained from the supplementary steam supplying device 61 so that supplementary steam that is sufficient for cooling can be reliably supplied.

Further, comparing the high pressure turbine 21 and the reheating type turbine 22, because the vane wheel diameter and length of the rotor blades is longer for the reheating type turbine 22, the amount of heat generated due to wind loss is larger in the reheating type turbine 22 than in the high pressure turbine 21. The amount of cooling steam required during execution of cooling is therefore also more for the reheating type turbine 22. It is therefore necessary to supply a sufficient amount of cooling steam to the high pressure turbine 21 and the reheating type turbine 22 from the high pressure steam valve 41 in order to supply an optimum amount of cooling steam to keep the loss of steam due to cooling steam supplying to a minimum.

If necessary, a supplementary steam supplying device 61*b* can be arranged in such a manner that a regulating valve 55*b* and a check valve 56*b* communicate with a low pressure steam pipe.

Cooling steam from the supplementary steam supplying device 61*b* is supplied to steam flowing through the crossover pipe 74 from the reheating type turbine 22 and the amount of steam supplied to the low pressure turbine 23 can be increased. The amount of steam required at the low pressure turbine 23 that is a large type compared to the high pressure turbine 21 and the reheating type turbine 22 can then be supplied. In this way, overheating due to windage loss can be suppressed at each of the high pressure turbine 21, reheating type turbine 22 and low pressure turbine 23. For example, approximately 16/h of steam can be added to steam flowing in the crossover pipe 74, although this differs depending on the plant and size etc.

After this, once the steam from the exhaust heat recovery boiler has reached the desired conditions and conditions sufficient to obtain an output from the steam turbine have been reached the low temperature reheated steam valve 101 is closed, as described above. When the bypass valve 44 is open, the low temperature reheated steam valve 101 is opened, the bypass valve 44 is closed, and the high pressure regulation valve 53 is closed (or open when the reheating turbine bypass valve 52 is open). The high pressure steam valve 41 is then opened and the steam generated at the exhaust heat recovery boiler 30 is supplied to the high pressure turbine, reheating turbine and low pressure turbine for activation. If ventilation has began, the amount of steam provided is gradually increased and an output is obtained from the steam turbine. Alternatively, the low temperature reheated steam valve 101 is opened as described above, the bypass valve 44 is closed, the high pressure turbine bypass valve 47 is opened, the high pressure steam valve 41 is closed steam generated at the exhaust heat recovery boiler 30 is supplied to the reheating turbine, the reheating turbine and low pressure turbine are activated and the high pressure turbine can also be sequentially activated. (when this kind of activation is not adopted, the high pressure turbine bypass valve 47 and the reheating turbine bypass valve 52 do not have to be provided).

Sufficient conditions for obtaining an output from the steam turbine can be decided by looking at, for example, the temperature of steam flowing in the high pressure steam piping, the pressure and the extent of overheating, etc. For example, the conditions for the steam introduced into the high pressure steam turbine can be detected by installing a temperature and pressure sensor 102 at the high pressure steam pipe 71. Moreover, conditions close to the conditions of introduction to the steam turbine can be understood by arranging temperature and pressure sensors at a position close to the steam turbine. Further, in order to protect the turbine, an element for determining the difference between the steam temperature and the turbine metal temperature is also possible. Alternatively, the gas turbine output can also be considered.

It is preferable to regulate these conditions in accordance with the scale and specifications of the plant.

For example, it can be determined that an output can be obtained from the steam turbine if the temperature is approximately 450° C. or more for a high turbine temperature and approximately 300° C. or more for a low turbine temperature, the pressure is 30 ata or more (still higher conditions are preferable in order to shorten the time until normal operation of the steam turbine) and the extent of overheating is approximately 30 degrees centigrade or more. Further, when a difference between the steam temperature and the turbine metal temperature of approximately 30° C. is obtained, it is preferable to add determining elements when the gas turbine output is 25% or more.

In the foregoing embodiments, the steam outputted by the high pressure turbine 21 flows through the bypass path 75. Alternatively, if all of the steam outputted from the high pressure turbine 21 does not have to flow to the bypass path 75, some of the steam outputted by the high pressure turbine may flow to the reheater 34.

In this embodiment, whether steam outputted by the high pressure turbine 21 flows to the reheater 34 or flows to the bypass path 75 is controlled using valves. However, it is also possible to omit one of the valves and for part of the steam to flow to the reheater 34 while the steam is flowing through the bypass path 75.

In this case, after the step of supplying cooling steam at the time of activation is complete, a transition is made to a step of supplying practically all of the steam generated by the high pressure drum 33 to the reheater 34 and an output is obtained from the steam turbine.

A further embodiment is described in the following

Figure 4:
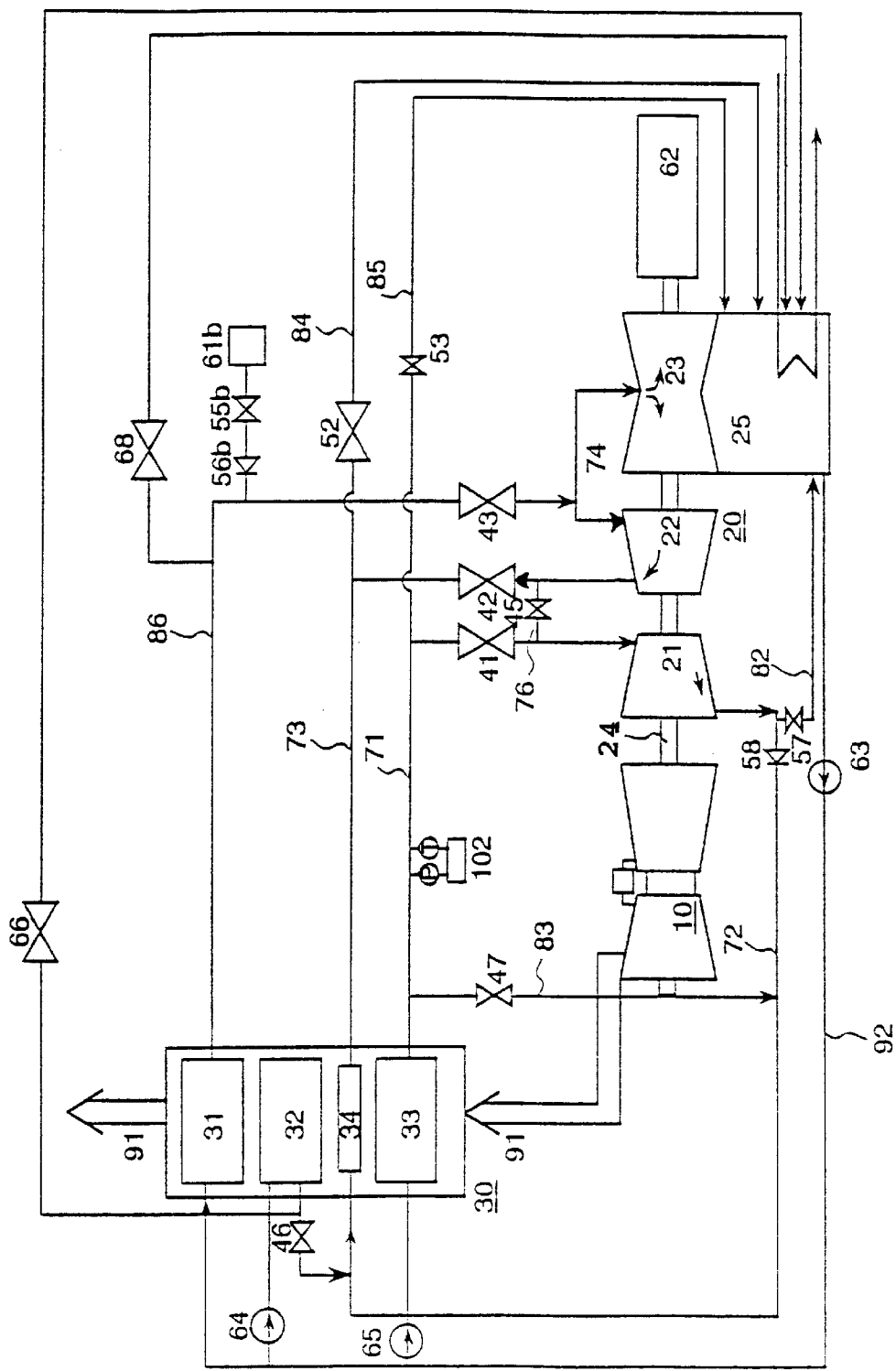
FIG. 4 is an outline illustration of the first embodiment of the present invention.

A second embodiment will now be described using the outline configuration view of FIG. 1 and the outline illustration of the embodiment of FIG. 4.

In addition to the common configuration, the supplementary steam supplying device 61b, regulating valve 55b and check valve 56b are arranged in such a manner as to communicate with low pressure steam piping. A connection path 76 connecting the high pressure steam pipe 71 and the high temperature reheating steam pipe 73 is provided and is equipped with a connection control valve 45. Each communicating part is downstream of the high pressure steam valve 41 and the reheated steam valve 42.

A high pressure turbine piping system 82 communicating with the condenser 25 is connected to the low temperature reheating steam pipe 72 and is provided with a discharge valve 57, A check valve 58 is provided downstream of the parts of the low temperature reheating steam pipe 72 connecting with the high pressure turbine piping system 82. Steam then flows so as to have the pressure and pressure gradient of the high pressure steam valve outlet supplying the steam.

Cooling steam is supplied to the high pressure turbine 21 and the reheating type turbine 22 in the period from activation of the gas turbine until there is ventilation to the gas turbine so that heating up due to windage loss of the turbines can be prevented.

The low pressure steam valve 43 and the connection control valve 45 are opened and steam from a supplementary steam supplying device 61 flows to the reheating type turbine 22, high pressure turbine 21 and the low pressure turbine 23. The amount of steam etc. is determined by the size of the plant, etc., but for example, approximately 18 t/h is supplied from the supplementary steam supplying device 61, approximately 16 t/h of the steam flows to the low pressure turbine side, and approximately 2 t/h flows to the reheating turbine side.

Steam generated at the supplementary steam supplying device 61b passes through the regulating valve 55b and the check valve 56b so as to flow to the low pressure steam pipe 86 and passes through the low pressure steam valve 43 controlled so as to be opened to a prescribed extent and steam is supplied to the reheating type turbine 22. Steam that passes through the reheating type turbine 22 then flows from the inlet side of the reheating type turbine 22 to the connection path 76, passes through the connection control valve 45 so as to enter the high pressure steam pipe 71 and is supplied to the high pressure turbine 21.

After this, steam that flowed through the high pressure turbine 21 flows into the high pressure turbine piping system 82 provided at the low temperature reheating steam pipe 72 and is discharged outside of the system for the low temperature reheating steam pipe 72 via the discharge valve 57 that is open to a prescribed extent. After this, the steam enters the condenser.

It is also possible to regulate the amount of steam suppled from the low pressure drum 31 together with the low pressure steam.

As a result of this, the amount of heat generated due to windage loss at each stage of the high pressure turbine 21 and the reheating type turbine 22 flows to the stage s prior to the reheating turbine and the stages following the high pressure turbine, the accumulation of heat is avoided and a cooling effect can be obtained.

For example, when the reheated steam valve 42 is opened and steam supplying is carried out to the high pressure turbine 21 from the side of the exhaust air, the cooling steam is heated up by the reheater 34 and high temperature steam flows into the low temperature reheating steam pipe 72 which is usually designed for low temperatures. The connection path 76 that bypasses the reheater 34 is therefore installed so as to connected the reheating turbine inlet part and the high pressure turbine exhaust part so that cooling steam can be supplied to the high pressure turbine 21 via this connection path 76 and flow of high temperature steam in the low temperature reheating steam pipe 72 can be prevented. Further, by completely closing the high pressure steam valve 41 and the reheated steam valve 42, obstruction of the flow of cooling steam can be prevented using the check valve 58 in the vicinity of the high pressure turbine discharge part of the low temperature reheating steam pipe 72.

Cooling steam supplied from the low pressure steam valve 43 is supplied separately to the supply side of the high pressure turbine 21 via the side of the low pressure turbine 23 and the reheating type turbine 22 but as the pressure loss in these flow paths is different, the amount of cooling steam supplied is determined by this pressure balance. Further, the amount of heat generated due to windage loss is different for each of the high pressure turbine 21, reheating type turbine 22 and low pressure turbine 23. The accompanying amount of required cooling steam also differs for each of these turbines and the amount of cooling steam supplied from the low pressure steam valve 43 is therefore decided taking into consideration this pressure balance and the amount of cooling steam required.

As a result, cooling of the high pressure, reheating and low pressure turbines can be achieved.

The providing of a single supplementary steam supplying device 61b as in this embodiment is therefore practical.

In this embodiment, the connection path 76 communicates with the low temperature reheating steam pipe 72 in the vicinity of the outlet side of the high pressure turbine.

Alternatively, the high pressure turbine piping system 82, communicating with the low temperature reheating steam pipe 72, can replace this connection path 76. Further, the high pressure turbine piping system 82 connected with the condenser 25 may communicate with the downstream side of the high pressure steam valve 41 of the high pressure steam pipe 71 that is in the vicinity of the inlet side of the high pressure turbine 21. This arrangement gives the same results. In this case, steam flows through the high pressure turbine 21 from the outlet side to the inlet side.

After this, if the steam from the exhaust heat recovery boiler has reached the desired conditions and conditions are sufficient to obtain an output from the steam turbine, the reheated steam valve 42 is opened, the connection control valve 45 is closed and the high pressure regulation valve 53 is closed (or the reheating turbine bypass valve 52 and the high pressure turbine bypass valve 47 is closed), the high pressure steam valve 41 is opened, and steam generated at the exhaust heat recovery boiler 31) is supplied to the high pressure turbine, the reheating turbine and the low pressure turbine for activation. Alternatively, the high pressure regulation valve 53 is closed (or the reheating turbine bypass valve 52 is closed), the reheated steam valve 42 is opened and the connection control valve 45 is closed, steam generated at the exhaust heat recovery boiler 30 is supplied to the reheating turbine, the reheating turbine and low pressure turbine are activated and the high pressure turbine is sequentially activated.

In this case, after the step of supplying cooling steam at the time of activation is complete, practically all of the steam generated at the high pressure drum 33 is supplied to the reheater 34.

If ventilation has started, the amount of steam supplied is gradually increased and an output is obtained from the steam turbine. The aforementioned deciding elements and conditions can then be used for the conditions etc. of the steam outputted from the discharge heat recovery boiler.

A further embodiment is described in the following.

Figure 5:
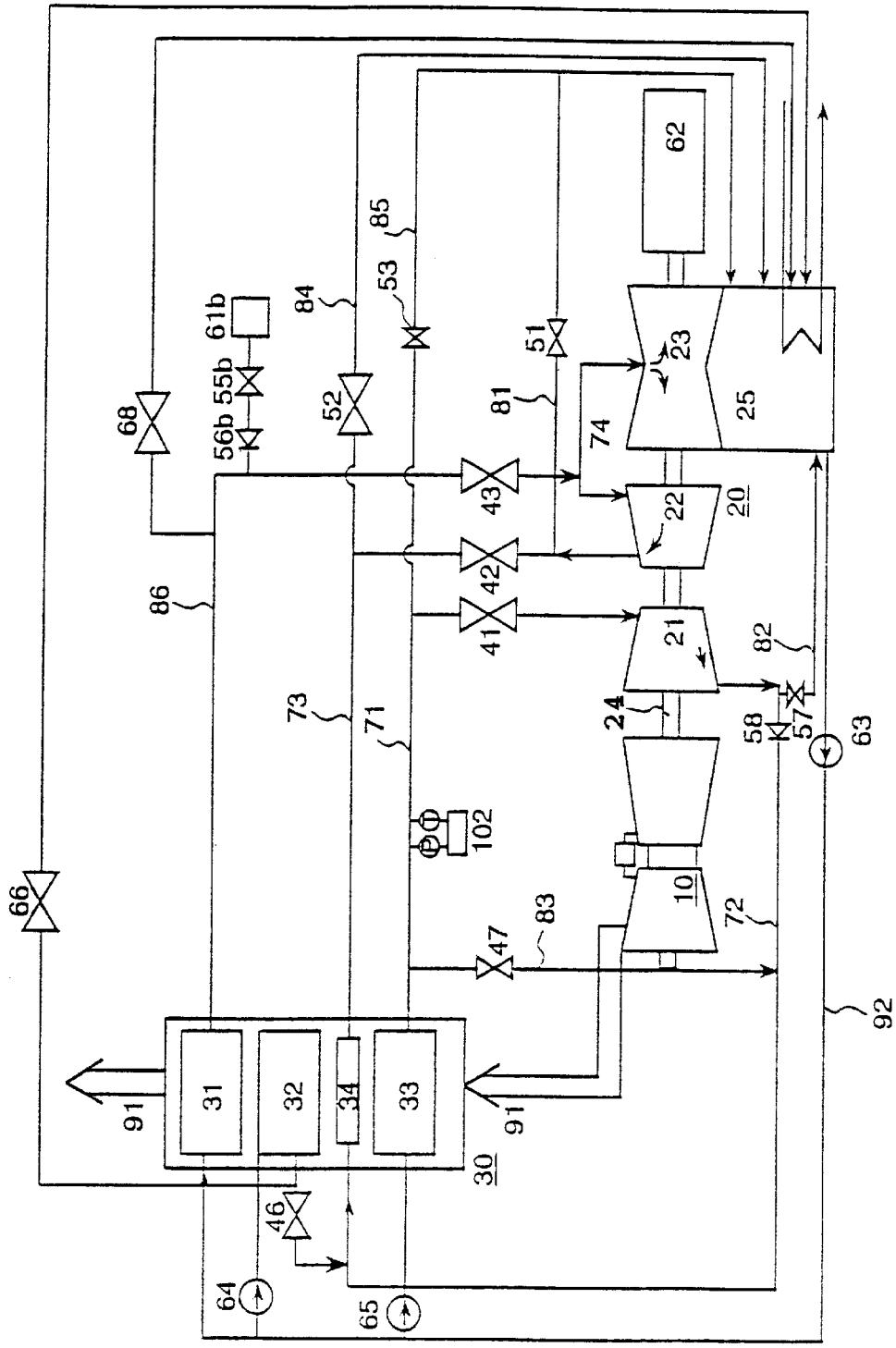
FIG. 5 is an outline illustration of the first embodiment of the present invention.

A third embodiment is now described using the outline configuration view of FIG. 1 and the outline illustration of the embodiment of FIG. 5.

In addition to the common configuration, the supplementary steam supplying device 61b, regulating valve 55b and check valve 56b are arranged in such a manner as to be connected by low pressure steam piping. A piping system 81 communicating with the condenser 25 is provided at the high temperature reheating steam pipe 73 on the downstream side of the reheated steam valve 42 and is provided with a reheating turbine discharge valve 51. The high pressure turbine piping system 82 communicating with the condenser 25 also communicates with the low temperature reheating steam pipe 72 and is provided with the discharge valve 57. The check valve 58 is provided downstream of the part of the low temperature reheating steam pipe 72 that communicates with the high pressure turbine piping system 82.

From the time of activation of the gas turbine unit 1 there is ventilation to the steam turbine the high pressure turbine 21, reheating type turbine 22 and low pressure turbine 23 communicate with the condenser 25, cooling steam is supplied to the reheating type turbine 22 and the low pressure turbine 23 and heating up due to the windage loss of these turbines is prevented.

The low pressure steam valve 43, reheating turbine discharge valve 51 and the discharge valve 57 and steam from the supplementary steam supplying device 61b flows to the low pressure turbine 23 and the reheating type turbine 22. The amount of steam flowing differs depending on the size of the plant but, for example, flows of 16 t/h on the low pressure turbine side and 2 t/h on the reheating turbine side are possible.

The supplementary steam supplying device 61b supplies to the low pressure steam pipe 86 via the regulating valve 55b and check valve 56b. Steam is supplied to the reheating type turbine 22 via the low pressure steam valve 43 controlled to be open to an extent that allows the required amount of steam to flow. Steam that passes through the reheating type turbine 22 enters the high temperature reheating steam pipe 73, flows into the piping system 81 and is discharged from the high temperature reheating steam pipe 73 via the reheating turbine discharge valve 51. This is then supplied to the condenser 25.

As the high pressure steam valve 41 is open, steam remaining at the high pressure turbine 21 enters the low temperature reheating steam pipe 72, flows through the high pressure turbine piping system 82 and is discharged outside the low temperature reheating steam pipe system 72 via the discharge valve 57 so as to be supplied to the condenser 25 thereafter.

In addition to the amount of heat generated due to windage loss being proportional to the vane wheel diameter and the rotor blade length, the amount of heat generated due to windage loss is also proportional to the specific weight of the steam within the atmosphere to which the rotor blades are exposed within the steam turbine, i.e. the steam pressure. It is, however, possible to reduce the amount of heat generated due to windage loss by lowering the pressure within the steam turbine 20 to as great an extent as possible. As a means for achieving this, a method is employed where the flow of steam to the high pressure turbine 21 and the reheating type turbine 22 is interrupted to as great an extent as possible, each steam turbine 20 is connected to a condenser that is in a vacuum state and the pressure within the steam turbine 20 is reduced.

In order to achieve low pressure conditions within the high pressure turbine 21, the high pressure steam valve 41 is closed completely, steam generated from the high pressure drum 33 is stopped and the check valve 58 is installed at the low temperature reheating steam pipe 72 at the discharge part side of the high pressure turbine 21 so as to isolate the reheater 34. Further, the high pressure turbine piping system 82 is installed so as to connect directly with the condenser 25 and the remaining steam is forcibly discharged to the condenser 25 by the flowing in of gland sealed steam within the high pressure turbine 21. Further, with the reheating type turbine 22 also, by completely closing the reheated steam valve 42 so as to interrupt the reheated steam and similarly installing the piping system 81 so as to directly connect with the condenser 25 at the inlet part of the reheating type turbine 22, steam within the reheating type turbine 22 can be forcibly discharged to the condenser 25 and a low pressure state can be attained within the reheating type turbine 22. As the rotor blades of the low pressure turbine 23 are long and generate a large amount of heat under vacuum conditions due to a condenser producing a small amount of heat in response to windage loss it is therefore preferable to supply cooling, steam to carry out forcible cooling. This vacuum is a vacuum of an extent obtained by a vacuum pump connected to the condenser 25 or a vacuum of an extent obtained by coupling with the condenser, the same being applied to the following cases.

As a result, supplying of reheated steam to the reheating type turbine 22, heat generation due to windage loss and remaining heat are suppressed. Further, some of the steam supplied from the low pressure steam valve 43 diverges at the crossover pipe 74 and is supplied to the low pressure turbine 23.

Supplying of steam superheated by the reheater 34 to the turbines can be suppressed and rises in the temperature of each turbine can be prevented.

In this embodiment, the influence of the exhaust heat recovery boiler 30 can be completely interrupted using the reheated steam valve 42 and the check valve 58 and the capacity of the supplementary steam generator can be made small.

Further, by opening the high pressure steam valve 41, steam within the high pressure turbine 21 flows through the high pressure turbine piping system 82 to the condenser 25 and the inside of the high pressure turbine 21 is put under low pressure. Alternatively, when the high pressure steam valve 41 is opened to a limited extent, some of the steam from the high pressure drum 33 may be supplied to the high pressure turbine 21 as cooling steam. For example, steam that passes through the high pressure turbine 21 flows from the low temperature reheating steam pipe 72 to the high pressure turbine piping system 82 and flows into the condenser 25. Even in such a case, windage loss can be suppressed at each of the turbines without being affected by reheating due to the reheater 34.

After this, if the steam from the exhaust heat recovery boiler 30 has reached the desired condition and the conditions are sufficient to obtain an output from the steam turbine, the reheated steam valve 42 is opened, the low pressure steam valve 43 is closed, the connection control valve 45 is closed, the high pressure regulation valve 53 is closed (or the reheating turbine bypass valve 52 is closed and the high pressure turbine bypass valve 47 is closed), the high pressure steam valve 41 is opened and steam generated by the exhaust heat recovery boiler 30 is supplied to the high pressure turbine, the reheating turbine and the low pressure turbine for activation. Alternatively the high pressure regulation valve 53 is closed (or the reheating turbine bypass valve 52 is closed), the reheated steam valve 42 is opened, the low pressure steam valve 43 is closed and the connection control valve 45 is closed, so that steam generated by the exhaust heat recovery boiler 30 is supplied to the reheating turbine, the reheating turbine and low pressure turbine are activated and the high pressure turbine is sequentially activated. If ventilation has commenced, the amount of steam supplied is gradually increased and an output from the steam turbine can be obtained.

After the step of supplying cooling steam at the time of activation is finished, practically all of the steam generated at the high pressure drum 33 is supplied to the reheater 34.

The aforementioned determining elements and conditions can be used for the conditions etc. of steam outputted from the exhaust heat recovery boiler. A further embodiment is described in the following.

Figure 6:
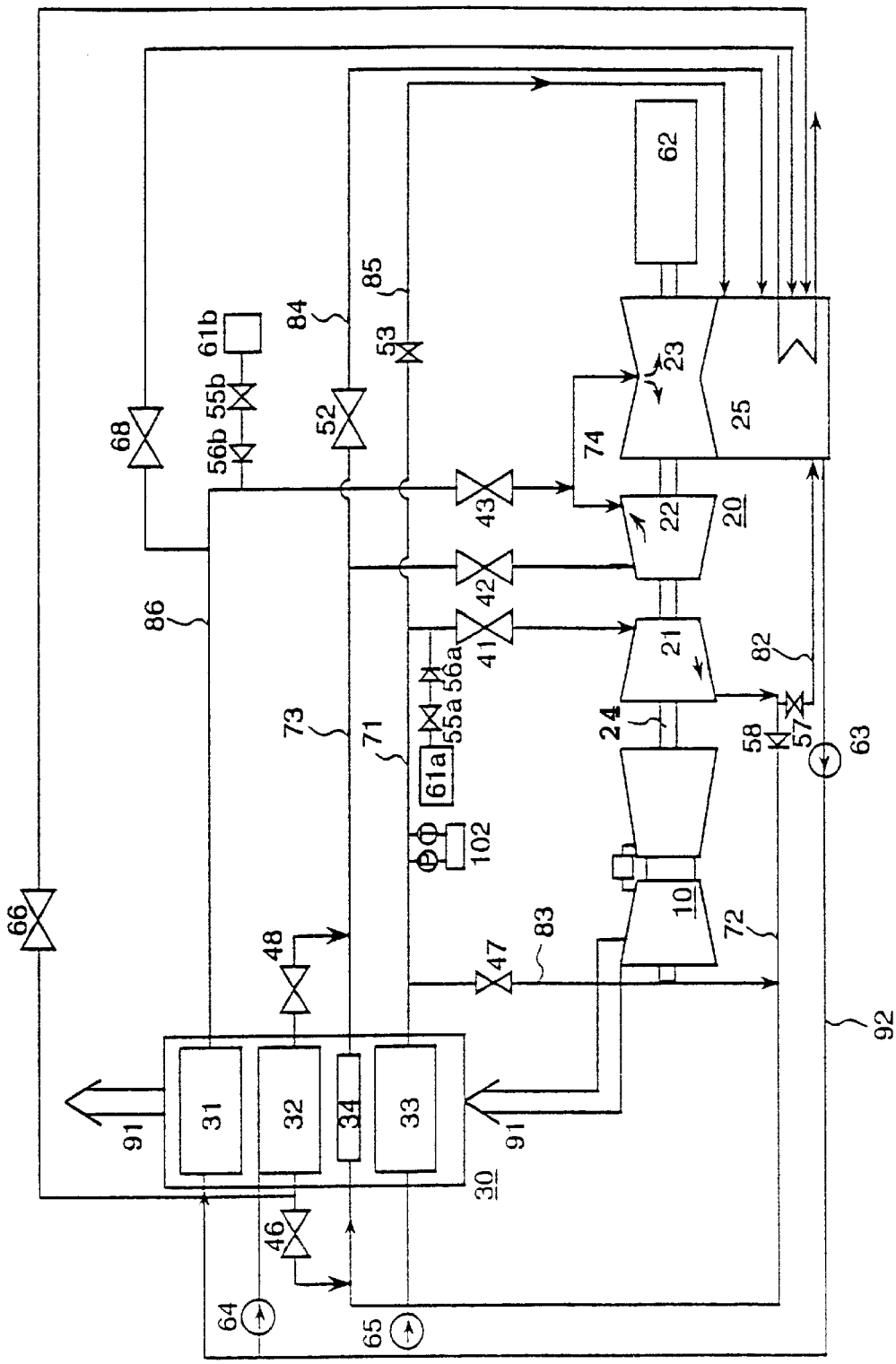
FIG. 6 is an outline illustration of the first embodiment of the present invention.

A fourth embodiment is now described using the outline configuration view of FIG. 1 and the outline illustration of the embodiment of FIG. 6.

In addition to the common configuration, the intermediate steam valve 48 is provided for regulating the amount of steam supplied from the intermediate pressure drum 32 to the high temperature reheating steam pipe 73. The high pressure turbine piping system 82 that communicates with the condenser 25 is connected to the low temperature reheating steam pipe 72 and the discharge valve 57 is also provided. The check valve 58 is also provided downstream from parts of the low temperature reheating steam pipe 72 that communicate with the high pressure turbine piping system 82.

For the period from activation of the gas turbine until there is ventilation to the steam turbine, when the reheating turbine bypass valve 52 is installed this is closed and the reheated steam valve 42, high pressure steam valve 41 and discharge valve 57 are opened.

Steam is then supplied individually from the high pressure drum 33 and the intermediate pressure drum 32 to the high pressure turbine 21 and reheating type turbine 22 and heating up due to the windage loss of both the high pressure turbine and the reheating turbine is prevented.

Steam of an intermediate pressure is supplied from the intermediate pressure drum 32 to the high temperature reheating steam pipe 73 via the intermediate steam valve 48 and from the reheated steam valve 42 to the reheating type turbine 22. Steam that passes through the reheating type turbine 22 then flows to the low pressure turbine 23 and is supplied to the condenser 25.

On the other hand, by limiting the extent to which the high pressure steam valve 41 is opened (within about 10% or less of being completely opened, i.e. 2 to 3% in practical terms), part of the high pressure steam of the high pressure drum 33 is supplied to the high pressure turbine 21. Steam that passes through the high pressure turbine 21 then flows through the low temperature reheating steam pipe 72, flows via the discharge valve 57 and flows through the high pressure turbine piping system 82 to the condenser 25.

As a result, steam generated at the exhaust heat recovery boiler 30 is supplied to the high pressure turbine and the reheating turbine without being reheated and the overheating due to the windage loss of each of the turbines can be suppressed.

After this, if the desired conditions for the steam from the exhaust heat recovery boiler are reached and sufficient conditions to obtain an output from the steam turbine are achieved, an output from the steam turbine is obtained as described above and a transition is made to normal operation. The determining elements and conditions described previously can be used for the conditions etc. of the steam outputted from the exhaust heat recovery boiler.

Figure 2A:
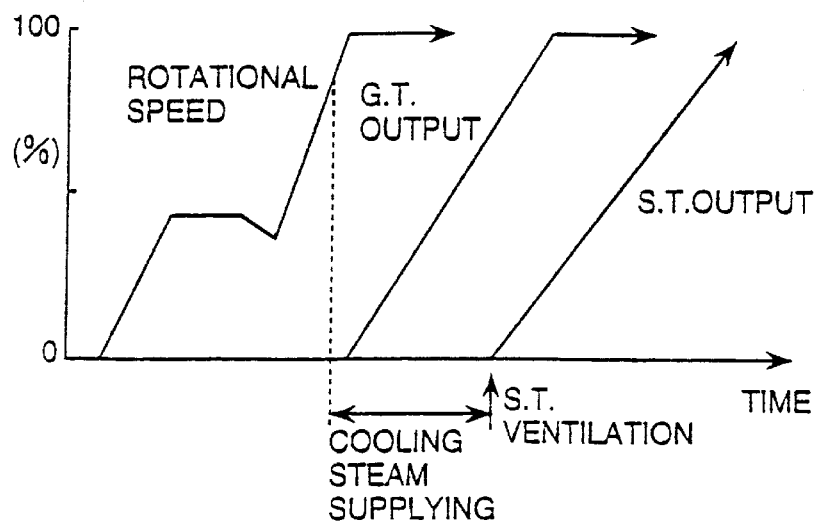
FIGS. 2(a) & 2(b) is an outline view of an example of conditions for applying the present invention.
Figure 2B:
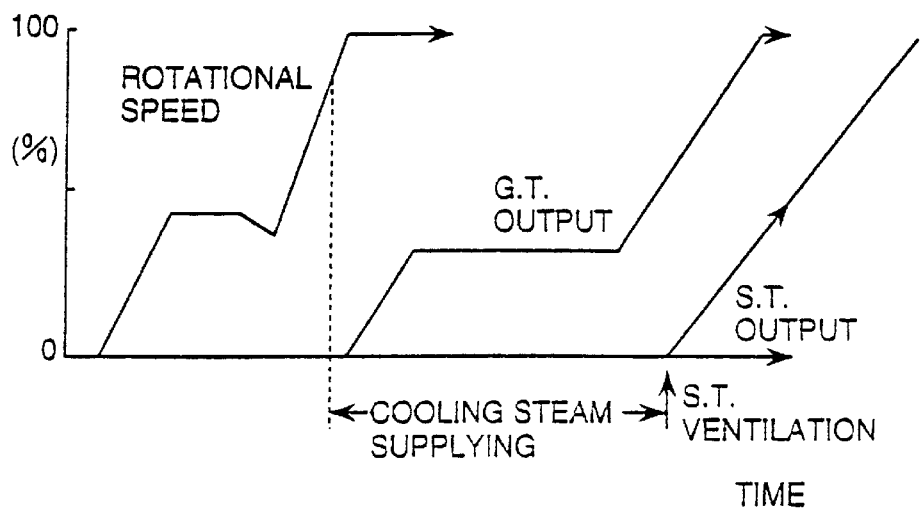

FIG. 2 is an outline view of an example of a situation to which the present invention is applied, where A shows the case at the time of normal operation and B shows the case where the time for providing cooling steam is long.

In the normal operation A, the gas turbine 10 is activated and as the steam turbine that is in a non-ventilated state causes overheating to occur due to windage loss while increasing it's speed, supplying of cooling steam is carried out. When the steam generating conditions of the exhaust heat recovery boiler 30 fall within a prescribed range in accompaniment with the rising of the output of the gas turbine 10, complete ventilation to the steam turbine 20 is carried out, an output from the steam turbine 20 is obtained and the cooling steam is not required.

However, as shown in B, when the time for which the gas turbine 10 operates independently prior to the starting of complete ventilation of the steam turbine 20 is prolonged, such as at the time of the occurrence of activation congestion, reactivation not long after halting of operation, or when the checking of other equipment is necessary, it is possible that the exhaust heat recovery boiler 30 will rise to a high temperature.

The time until complete ventilation is influenced by the metal temperature conditions etc. of the steam turbine and can be a few minutes or, as in the case of B, a few hours.

In the case of B, when a system is present for supplying cooling steam via the exhaust heat recovery boiler 30 to the reheating type turbine 22, the cooling steam is superheated at the reheater 34 of the exhaust heat recovery boiler 30 and the superheated cooling steam is supplied to the reheating turbine. In this case, the present invention shown in each of the above embodiments operates effectively when steam generated by the exhaust heat recovery boiler 30 is reheated and not supplied to the reheating type turbine 22.

What is claimed is:

1. A single shaft combined cycle plant, comprising:

a gas turbine;

an exhaust heat recovery boiler for generating steam using exhaust heat discharged from the gas turbine; and a steam turbine driven by steam generated from the exhaust heat recovery boiler, rotors of the gas turbine and rotors of the steam turbine being coupled, and the steam turbine comprising: a high pressure turbine being driven by high pressure steam generated at a superheater of the exhaust heat recovery boiler supplied via a first steam path, and a reheating turbine supplied with and driven by steam that passes through the high pressure turbine, and a second steam path, and is reheated by a reheater of the exhaust heat recovery boiler, with the reheated steam then passing through a third steam path, wherein:

separately provided steam supplying means supplies steam to the reheating turbine;

a steam connecting path connects the third steam path and the first steam path; and discharging means discharges steam supplied from the steam supplying means that flows via the reheating turbine and flows through the second steam path to outside of the second steam path.

2. The single shaft combined cycle plant of claim 1, wherein steam discharged to outside of the second steam path is supplied to a condenser.

3. A method of activating a single shaft combined cycle plant, comprising a gas turbine, an exhaust heat recovery boiler for generating steam using exhaust heat discharged from the gas turbine and a steam turbine driven by steam generated from the exhaust heat recovery boiler, rotors of the gas turbine and rotors of the steam turbine being coupled, and the steam turbine comprising: a high pressure turbine being driven by high pressure steam generated at a superheater of the exhaust heat recovery boiler supplied via a first steam path, and a reheating turbine supplied with and driven by steam that passes through the high pressure turbine, and a second steam path, and is reheated by a reheater of the exhaust heat recovery boiler, and passes through a third steam path, said activating method comprising:

a first step of activating the gas turbine and causing the rotational speed thereof to rise;

a second step of supplying gas turbine exhaust gas to the exhaust heat recovery boiler and causing steam to be generated at the exhaust heat recovery boiler;

a third step of supplying steam to the high pressure turbine through the reheating turbine and a steam connecting path provided in such a manner as to connect the third steam path and the first steam path; and discharging steam flowing through the second steam path via the high pressure turbine to outside of the second steam path via discharging means provided at the second path;

a fourth step of supplying steam generated by the superheater to the reheating turbine via the reheater after desired conditions for the steam generated from the exhaust heat recovery boiler are reached; and a fifth step of obtaining an output from the steam turbine.

* * * * *